(12) United States Patent
Lenk et al.

(10) Patent No.: US 9,882,263 B2
(45) Date of Patent: Jan. 30, 2018

(54) PIVOTABLE HORN ANTENNA FOR A RADAR LEVEL INDICATOR

(71) Applicant: VEGA Grieshaber KG, Wolfach (DE)

(72) Inventors: Fritz Lenk, Schiltach (DE); Clemens Hengstler, Haslach (DE)

(73) Assignee: VEGA GRIESHABER KG, Wolfach (DE)

( * ) Notice: Subject to any disclaimer, the term of this patent is extended or adjusted under 35 U.S.C. 154(b) by 127 days.

(21) Appl. No.: 14/522,755

(22) Filed: Oct. 24, 2014

(65) Prior Publication Data

US 2015/0122013 A1  May 7, 2015

(30) Foreign Application Priority Data

Nov. 5, 2013 (EP) .................................. 13191577

(51) Int. Cl.
*H01Q 1/22* (2006.01)
*H01Q 3/08* (2006.01)
*G01F 23/284* (2006.01)

(52) U.S. Cl.
CPC ........... *H01Q 1/225* (2013.01); *G01F 23/284* (2013.01); *H01Q 3/08* (2013.01)

(58) Field of Classification Search
CPC ......... H01Q 1/225; H01Q 3/08; G01F 23/284
USPC .................. 73/290 R, 290 V, 866.5; 342/124
See application file for complete search history.

(56) References Cited

U.S. PATENT DOCUMENTS

| | | | | |
|---|---|---|---|---|
| 8,206,598 | B2 * | 6/2012 | Wulffen | B01D 29/114 210/791 |
| 2006/0005621 | A1 * | 1/2006 | Lenk | G01F 23/284 73/290 V |
| 2006/0201245 | A1 * | 9/2006 | Huber | G01F 23/003 73/290 R |
| 2007/0085752 | A1 * | 4/2007 | Kienzle | G01F 23/284 343/840 |
| 2008/0100501 | A1 * | 5/2008 | Edvardsson | G01F 15/12 342/124 |
| 2014/0266864 | A1 * | 9/2014 | Fredriksson | G01F 23/284 342/124 |

FOREIGN PATENT DOCUMENTS

| | | | |
|---|---|---|---|
| DE | 20 2005 008 528 | 9/2005 | |
| DE | 10 2004 041 857 | 3/2006 | |
| DE | 10-2007-061571 | 7/2009 | |
| TW | M308510 | 3/2007 | |
| WO | 2006/063930 | 6/2006 | |
| WO | WO 2006063930 A1 * | 6/2006 | ........... G01F 23/284 |
| WO | 2007/042324 | 4/2007 | |

* cited by examiner

*Primary Examiner* — R. A. Smith
*Assistant Examiner* — John M Royston
(74) *Attorney, Agent, or Firm* — Fay Kaplun & Marcin, LLP

(57) ABSTRACT

Disclosed is a pivotable horn antenna intended for a radar level indicator and includes a ball joint, the joint socket of which can be screwed into a threaded hole in the container. This allows for optimization of the echo signal and correction of slanted installation of the horn antenna.

11 Claims, 5 Drawing Sheets

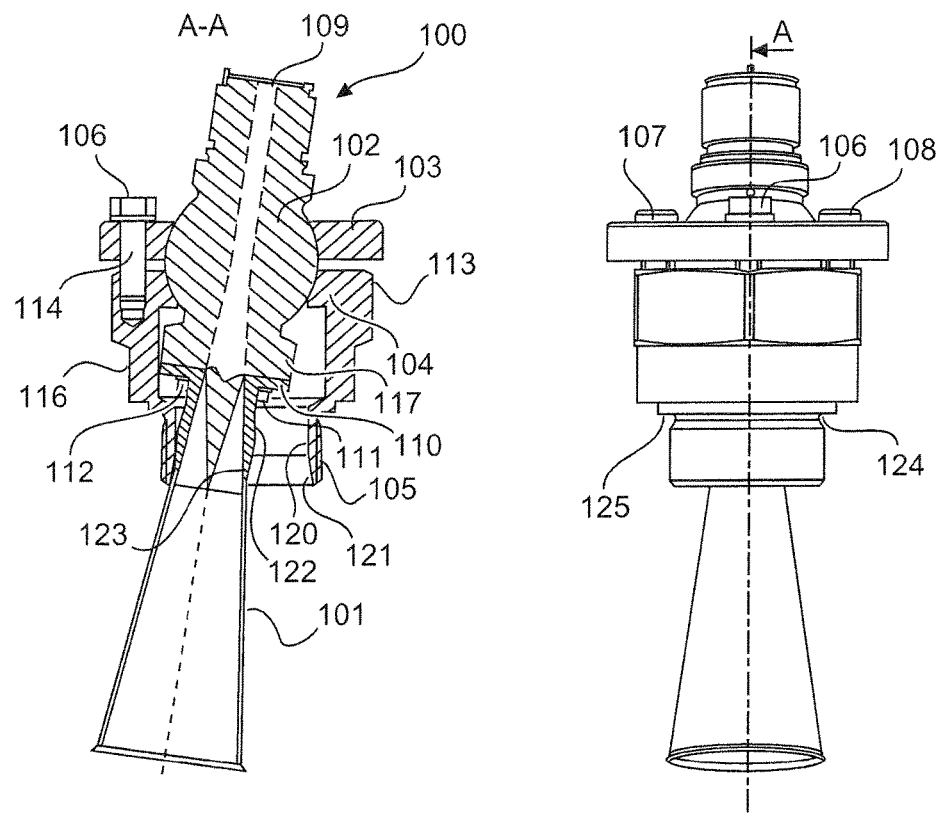
Fig. 1A
Fig. 1B
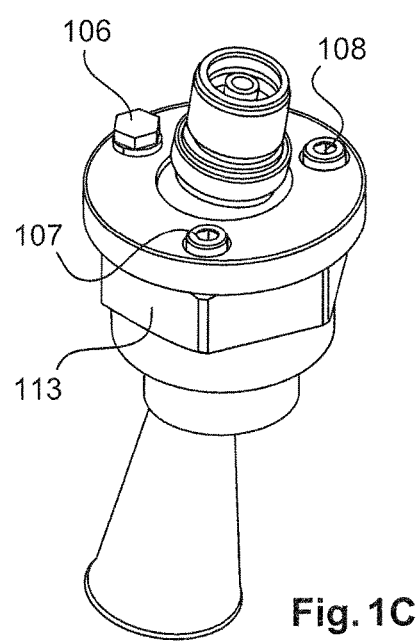
Fig. 1C

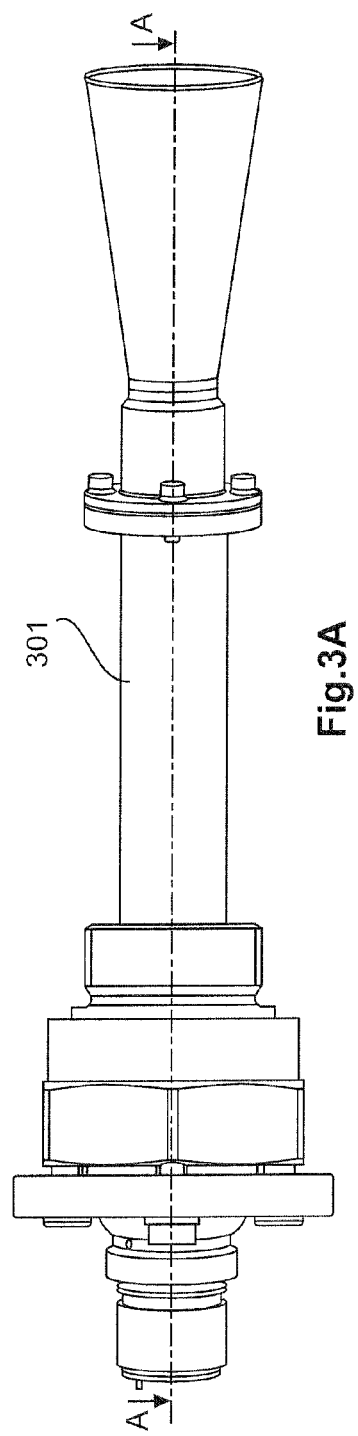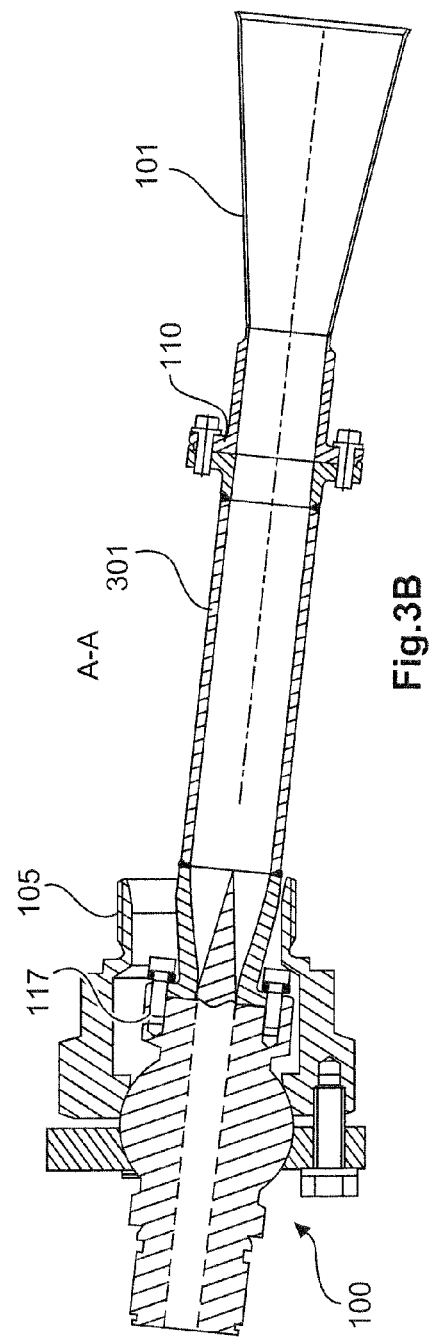

PIVOTABLE HORN ANTENNA FOR A RADAR LEVEL INDICATOR

REFERENCE TO RELATED APPLICATIONS

This application claims the benefit of the filing date of EP Patent Applications Serial No. 13 191 577.9 filed on 5 Nov. 2013, the disclosure of which is hereby incorporated herein by reference.

FIELD OF THE INVENTION

The present invention relates to radar level indication technology. In particular, the invention relates to a pivotable horn antenna for a radar level indicator and to a radar level indicator comprising a horn antenna of this type.

TECHNICAL BACKGROUND

Radar level measurement devices (radar level indicators) can be attached to the flanges of containers. The container flanges are openings in the container lid having typical diameters of several inches. The radar level indicators are then screwed onto said flange by means of a plurality of screws.

To improve the quality of the echo signal detected by the radar level measurement device, it can be useful to pivot the radar level measurement device following the installation thereof in the container and to orientate said measurement device towards the level surface in order to correct slanted installation of the device for example.

SUMMARY OF THE INVENTION

According to a first aspect of the invention, a pivotable antenna arrangement for a radar level indicator is specified. The pivotable antenna arrangement comprises an antenna, for example in the form of an antenna horn, which emits the transmitted signal.

In addition, a region in the form of a ball joint head is provided. The ball joint head can be a part of the antenna or arranged above the antenna so that the ball joint head is located between the electronics of the radar level indicator, which electronics generates the transmitted signal, and the antenna. It can also fundamentally be provided to arrange the ball joint head at the lower end of the antenna.

Further provided is a housing having a joint socket in which the ball joint head can rotate. The housing comprises an external thread in order to screw the antenna into a threaded hole in a container, in which the filling material of which the fill level is to be measured is located.

The ball joint head may be a part of the antenna, e.g. the antenna horn, or may be arranged above the antenna (e.g. the antenna horn) and connected to the antenna. The lower region of the housing surrounds at least a part of the ball joint head and the antenna, and has an outer diameter which decreases towards the lower end of the housing. For example, the outer diameter of the lower region of the housing may decrease in a stepped manner.

A flange connection between the container and the radar level indicator is thus not required. Instead, the radar level measurement device is screwed into a threaded hole in the container in a very simple manner.

This type of attachment is simple and effective. A complex flange connection between the radar level measuring device and container is not necessary. It is also possible to make a hole in a thin sheet wall, to thread the external thread of the housing through said hole and to fasten using a nut.

The threaded hole has, for example, a diameter of 1 inch, 1.5 inches or 2 inches.

According to one embodiment of the invention, the joint socket comprises a lower region and an upper region that can be attached in a lower region. The lower region allows the antenna horn to be guided through from above so that said horn protrudes out from the joint socket on the other side of the lower region. Once the antenna horn has been guided through the lower region, the upper region is attached to the lower region.

This can take place for example by screwing the upper region onto the lower region. For this purpose, the upper region comprises for example one or more holes, through which it is possible to guide screws which are screwed into corresponding threaded holes in the lower region.

Alternatively or in addition, it can be provided that the upper region comprises an external thread which is screwed into a corresponding internal thread of the lower region.

By tightening the screw connection between the upper region and the lower region, the ball joint head can be clamped in the joint socket so that the horn antenna can no longer pivot. Releasing one of the for example three screws is sufficient to release the ball joint head so that the antenna can be pivoted. The remaining screws can comprise a different screw head or other marking, so that the user identifies which screw has to be released to pivot the antenna.

According to another embodiment of the invention, the lower region of the housing of the joint socket comprises an external thread in order to screw the horn antenna into the threaded hole in the container.

Fundamentally, the outer thread can also be attached to the upper region of the housing. In this case, the horn antenna would in fact be screwed into the threaded hole from the inside of the container.

According to another embodiment of the invention, the pivotable antenna arrangement is configured as a waveguide, to the end of which an antenna horn is attached.

The transmitted signal generated by the signal generation electronics of the radar level indicator is thus conducted through the waveguide of the ball joint head and then fed into the horn of the antenna arrangement.

According to another embodiment of the invention, the ball joint head is screwed onto the antenna horn. The connection is flange-like, for example.

According to another aspect of the invention, a radar level indicator is specified having a pivotable horn antenna described above and below.

In the following, embodiments of the invention will be described with reference to the drawings.

BRIEF DESCRIPTION OF THE DRAWINGS

FIGS. 1A, 1B and 1C show a pivotable antenna arrangement according to a first embodiment of the invention.

FIGS. 3A and 3B show a pivotable antenna arrangement according to another embodiment of the invention.

DETAILED DESCRIPTION OF EMBODIMENTS

Figure 2A:
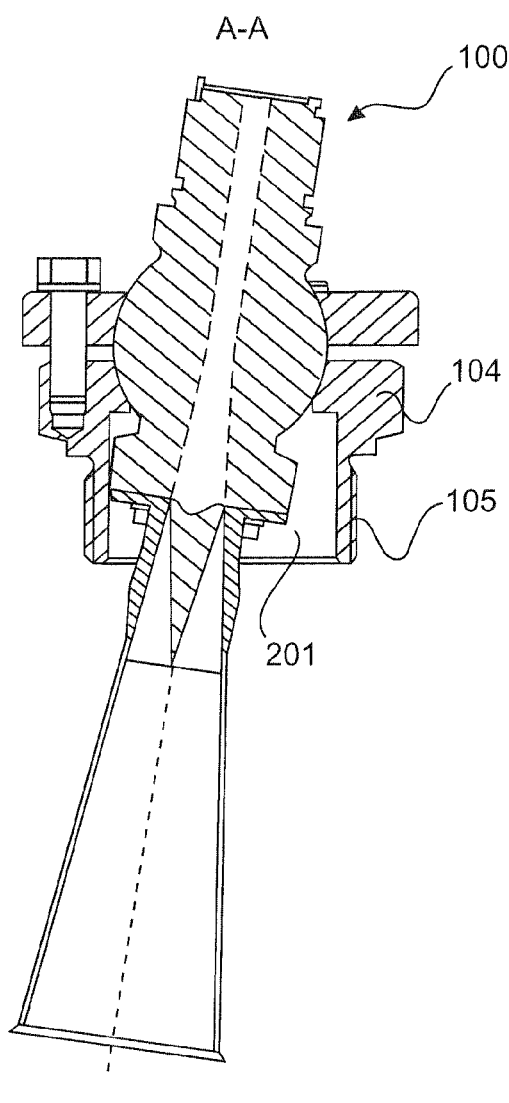
FIGS. 2A and 2B show a pivotable antenna arrangement according to another embodiment of the invention.

The drawings are schematic and not to scale.

Where identical reference numerals are used in the following description of the drawings, they denote like or similar elements. However, like or similar elements may also be denoted by different reference numerals.

FIGS. 1A, 1B and 1C are a sectional view, a side view and perspective view, respectively, of a pivotable antenna arrangement according to an embodiment of the invention. The antenna arrangement can be configured as a horn antenna. Other antenna shapes are also possible however, for example rod antennas.

The pivotable antenna arrangement comprises an antenna horn 101, the upper end of which comprises a flange 110 which is attached by a plurality of screws 111, 112 to a corresponding mating flange of a ball joint head 102 adjacent to the antenna horn. The ball joint head 102 comprises a spherical region which is supported by a two-part joint socket 103, 104.

The two-part joint socket is a part of a housing and comprises an upper region 103 which can for example be plate- or disc-like and has a round cross section. This upper region 103 comprises a plurality of holes, for example three holes, through which the screws 106, 107, 108 can be guided. One of these holes 114 is visible in FIG. 1A.

The three screws can be bonded at the factory and, in order to tilt the antenna, the user simply releases the screw 106 that has a different screw head to the two other screws.

The lower region 104 is housing-like and surrounds parts of the ball joint head 102 and the antenna horn 101 of the pivotable horn antenna.

At the lower end of the lower region 104 of the joint socket there is an external thread 105 which can be screwed into a corresponding threaded hole of the container. The external thread has a diameter of for example 1.5 inches or 1 inch.

An additional external thread can also be attached to the middle section 116 of the lower region 104 of the joint socket.

Above the external thread 105 there is a narrowing 124 in the housing, adjacent to which is a contact surface 125 which hits the outer surface of the container when the antenna arrangement is screwed in.

Below the ball joint head 102 there is a bulge 117 which forms the flange for flange-mounting the antenna horn 101 and in which internal threaded holes can be provided for screwing on (flange-mounting) the antenna horn 101.

The internal region of the ball joint head 102 is designed as a waveguide and is used to transmit transmitted signals to the horn antenna and to transmit the received signal picked up by the horn antenna to the interface 109, from which the received signal is relayed further to the electronics of the radar level indicator.

As can be seen in the drawings, the external cross section of the lower region 104 of the housing becomes smaller in steps. For example three steps are provided, it being possible for the lower third to comprise the outer thread 105 and the upper third 113 to have for example a hexagonal cross section, so that a spanner can be placed thereon to screw the horn antenna into the container hole.

Figure 2B:
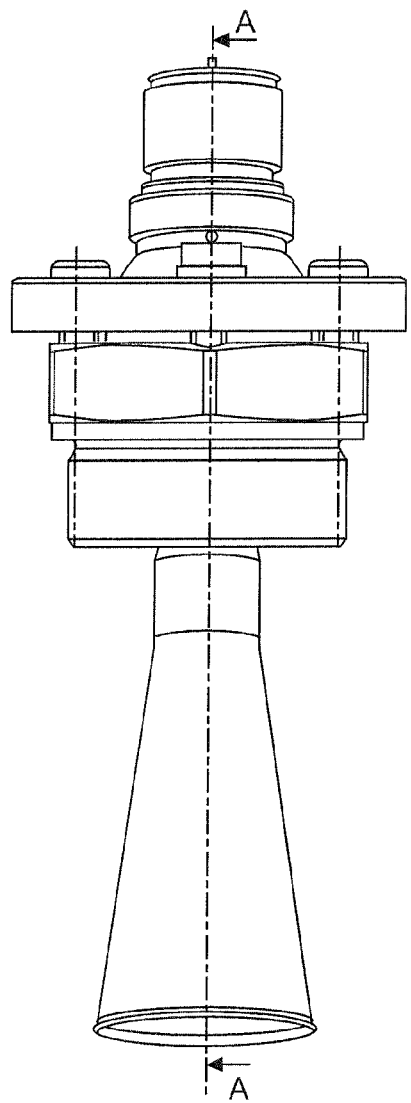

The embodiment of FIG. 1A to 1C has for example a 1½ inch external thread 105, whereas the embodiment of FIGS. 2A and 2B can have an 2 inch external thread 105. In this embodiment, the cross section of the lower region of the joint socket 104 is not formed in three steps, but rather in two.

The opening 201 in the lower region of the joint socket, in which opening both the flange-like region of the ball joint and the upper region of the horn antenna move, is cylindrical.

FIGS. 3A and 3B show a pivotable horn antenna having an external thread 105 of for example 1½ inches, the horn antenna comprising an antenna extension 301. This antenna extension 301 can be arranged between the flange 110 of the horn antenna 101 and the flange 117 of the joint socket.

Figure 4A:
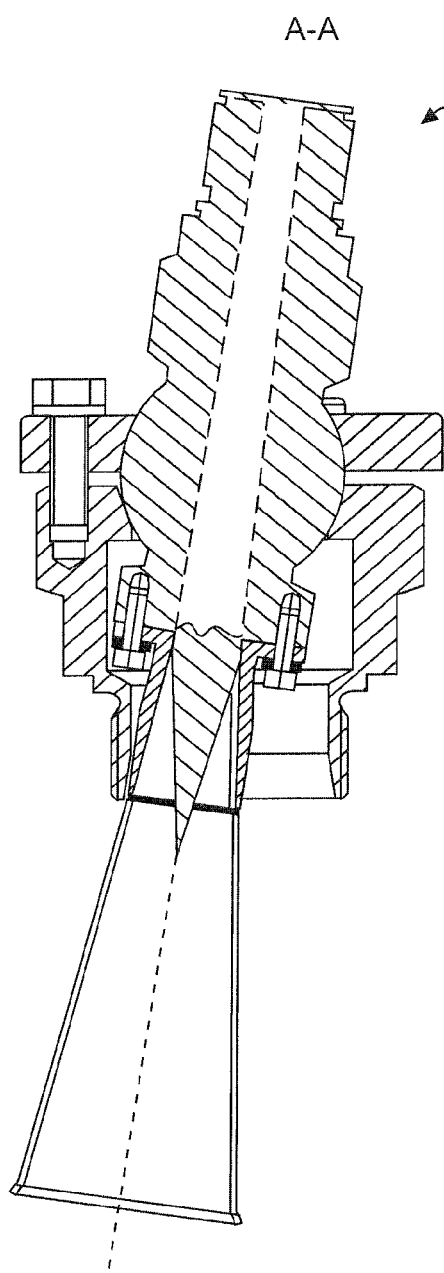
FIGS. 4A and 4B show a pivotable antenna arrangement according to another embodiment of the invention.
Figure 4B:
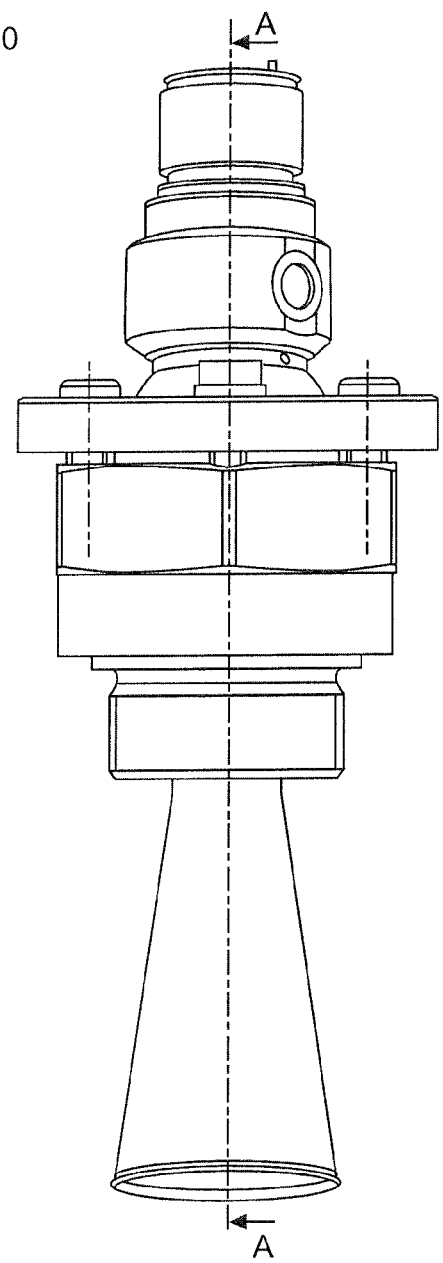

FIGS. 4A and 4B show a pivotable horn antenna also having a 1½ inch external thread of the housing and having a rinsing connector to pump air through the antenna into the container.

Figure 5:
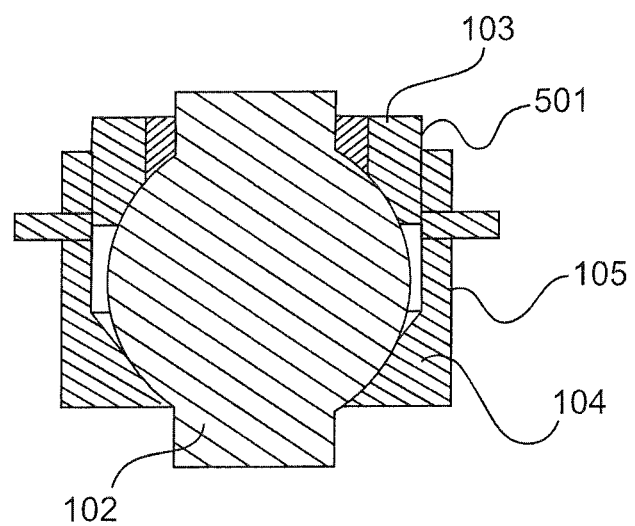
FIG. 5 shows a ball joint of a pivotable antenna arrangement according to another embodiment of the invention.

FIG. 5 shows a ball joint head 102 of a pivotable horn antenna, which ball joint head is located in a housing having a joint socket 103, 104. The upper region 103 of the housing comprises an external thread 501 which can be screwed into the lower region 104 of the housing. The lower region 104 of the housing can likewise comprise an external thread 105 which can be screwed into a threaded hole in the container lid.

Figure 6:
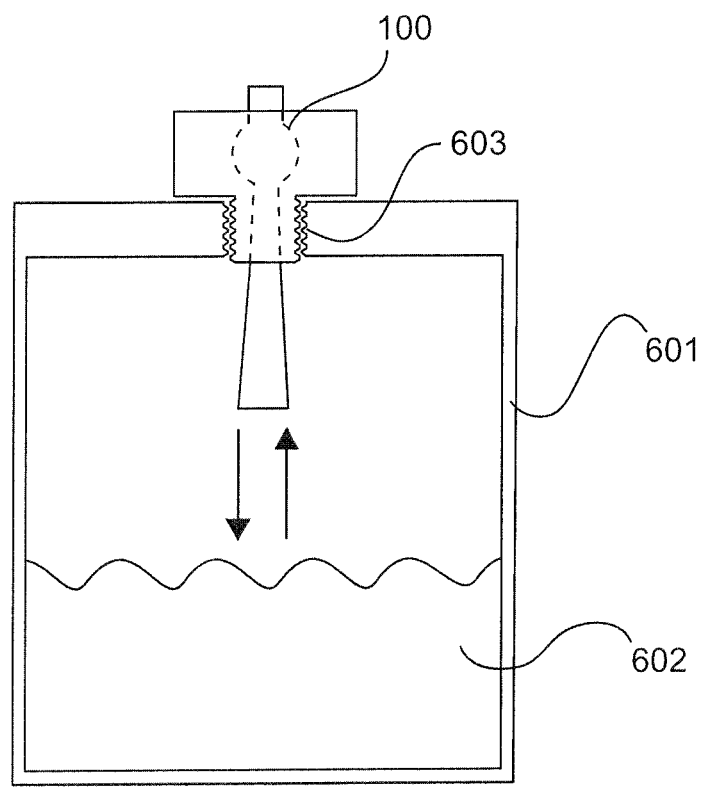
FIG. 6 shows a level measuring device in a container according to an embodiment of the invention.

FIG. 6 shows a pivotable horn antenna 100 of a radar level indicator installed in a container 601. For this purpose, the container 601 comprises a threaded hole 603 in the cover region, into which hole the pivotable antenna arrangement can be screwed. In the container there is a filling material 602, the level of which is to be measured.

The pivotable antenna arrangement is inexpensive to produce and easily assembled by the customer. Very little effort is required at the point of assembly. In this manner, the level measuring device can be mounted in the screw-in connection piece such as to be pivotable and orientable. The screw-in connection piece is constructed such that the basic individual parts of the device can be used in all variants having a rinsing connector and antenna extension. A flange connection between the antenna arrangement or radar level indicator and container is not required.

The thread size of the screw-in connection piece limits the maximum usable pivot angle of the antenna arrangement. For example, the maximum usable pivot angle with a thread size of 1½ inches is up to −8°, and up to −10° with a thread size of 2 inches. In order to maximise the maximum pivot angle, the threaded connection piece (screw-in connection piece, also referred to above as the lower region of the housing of the joint socket) is hollowed out as much as possible. In other words, said connection piece is as thin-walled as possible.

As can be seen in the 1½ inch thread version in FIG. 1A to 1C, in order to maximise the pivot angle it can be provided that the lower region of the joint socket housing 104 first has a cylindrical opening 120 at its lower end, which opening then widens in a conical manner towards the end of the lower region in the region 121.

The outer surface of the antenna horn is also designed to have a constant wall thickness in the upper region 122 thereof near the flange connection 110. However, in the region where the antenna horn touches the internal wall 121 of the lower part 104 of the joint socket at the maximum pivot angle, the wall thickness of the antenna horn becomes narrower (see region 123). In this way, the maximum pivot angle can be increased.

This geometry can also be seen in the embodiment in FIGS. 4A and 4B.

Moreover, it should be noted that "comprising" and "having" do not exclude the possibility of other elements or steps, and "one" or "a" does not exclude the possibility of a plurality. It should further be noted that features or steps which have been described with reference to one of the above embodiments may also be used in combination with other features or steps of other above-described embodiments. Reference numerals in the claims should not be treated as limiting.

The invention claimed is:

1. A pivotable antenna arrangement for a radar level indicator, comprising:
   an antenna horn;
   a region in a form of a ball joint head attached to the antenna horn; and
   a housing having a joint socket, in which the ball joint head can rotate, and which includes a lower region and an upper region that is attachable to the lower region;
   wherein the lower region has an outer diameter, which decreases stepwise towards a lower end of the lower region, with an external thread at the lower end, and a substantially cylindrical recess concentric with the external thread, which is designed for guiding through the antenna before the upper region is attached to the lower region and forms part of the joint socket;
   wherein the recess of the lower region is arranged below the ball joint socket of the lower region;
   wherein the external thread surrounds the antenna horn, which protrudes from the cylindrical recess, and is configured to screw the antenna arrangement into a threaded hole in a container; and
   wherein the external thread has a diameter of two inches or less.

2. The pivotable antenna arrangement according to claim 1, wherein the upper region is screwed onto the lower region.

3. The pivotable antenna arrangement according to claim 2, wherein the upper region has one or more holes in order to be screwed onto the lower region.

4. The pivotable antenna arrangement according to claim 2, wherein the upper region has an external thread in order to be screwed onto the lower region.

5. The pivotable antenna arrangement according to claim 1, wherein the ball joint head is designed as a waveguide, to the lower end of which the antenna is attached and the upper end of which is designed for connection to the electronics of a radar level indicator.

6. The pivotable antenna arrangement according to claim 1, wherein the ball joint head is screwed onto the antenna horn.

7. A radar level indicator, comprising:
   a pivotable antenna arrangement according to claim 1.

8. The pivotable antenna arrangement according to claim 1, wherein the external thread diameter is 1 inch or 1.5 inches.

9. The pivotable antenna arrangement according to claim 1, wherein the antenna horn has a decreasing wall thickness in the region, in which the antenna horn touches the inner wall of the lower region of the housing when the tilt angle is maximum, such that the maximum tilt angle is increased.

10. The pivotable antenna arrangement according to claim 1, wherein the substantially cylindrical recess of the lower region of the housing has an increased diameter at the lower end.

11. The pivotable antenna arrangement according to claim 1, further comprising:
    a narrowing above the external thread and adjacent to a contact surface of the lower region, wherein the contact surface contacts the outer surface of the container when the pivotable antenna arrangement is screwed into the threaded hole in the container.

* * * * *